United States Patent
Guo

(10) Patent No.: US 7,486,422 B2
(45) Date of Patent: Feb. 3, 2009

(54) METHOD AND APPARATUS FOR AUTOMATIC FILM RECOGNITION

(75) Inventor: Xian-Qiang Guo, Sujhou (CN)

(73) Assignee: Qisda Corporation, Taoyuan County (TW)

( * ) Notice: Subject to any disclaimer, the term of this patent is extended or adjusted under 35 U.S.C. 154(b) by 1065 days.

(21) Appl. No.: 10/935,529

(22) Filed: Sep. 7, 2004

(65) Prior Publication Data

US 2005/0063584 A1 Mar. 24, 2005

(30) Foreign Application Priority Data

Sep. 9, 2003 (TW) .............................. 92124856 A

(51) Int. Cl.
*H04N 1/04* (2006.01)
(52) U.S. Cl. ...................... 358/474; 358/475; 358/486; 358/487
(58) Field of Classification Search ................. 358/474, 358/475, 486, 487, 509, 505, 488
See application file for complete search history.

(56) References Cited

U.S. PATENT DOCUMENTS

| | | | |
|---|---|---|---|
| 6,233,059 B1 * | 5/2001 | Kodaira et al. | 358/1.9 |
| 6,259,540 B1 * | 7/2001 | Hsu et al. | 358/474 |
| 6,703,604 B2 * | 3/2004 | Tseng et al. | 250/235 |
| 7,327,493 B2 * | 2/2008 | Yamada et al. | 358/1.9 |

FOREIGN PATENT DOCUMENTS

JP 2000078600 * 3/2000

* cited by examiner

*Primary Examiner*—Houshang Safaipour

(57) ABSTRACT

Methods and systems for recognizing a film in a scanner are provided. First, the film is previewed by the scanner to obtain an original preview image. The original preview image comprises a film image corresponding to the film. The original preview image also comprises pixels and each pixel has a first hue value, a second hue value, and a third hue value. The pixels with luminance in a predetermined range are then selected from the original preview image to acquire a second preview image. Next, the second preview image is framed according to the first hue values of the pixels to obtain an image frame. Finally, the image frame is sectioned to recognize the film image.

66 Claims, 12 Drawing Sheets

METHOD AND APPARATUS FOR AUTOMATIC FILM RECOGNITION

BACKGROUND

The present invention relates to film recognition.

An important application in image processing is scanning film, such as positive film or negative film, for further processing in a computer. Conventionally, film is fixed in a film holder and placed on the panel of a scanner for scanning. Related information, such as holder size or position thereof, is transmitted to driver programs of the scanner. A computer connected to the scanner then recognizes the film images according to the received information.

The mentioned conventional method presents some drawbacks. For instance, film recognition is constrained by the film holder of the scanner. If the film is not fixed in a film holder provided by the scanner typically, the scanner cannot recognize the film therein. Moreover, the size and the placement of the film holder typically varies according to the scanner. Thus, non-uniformity may be considered inconvenient. Moreover, the related film holder information can be sent to the driver programs of the scanner for film recognition. When a different film holder is used, the scanner driver programs probably are changed accordingly for film recognition. Frequent driver programs changes may be detrimental to automated image processing.

SUMMARY

The methods first preview the film via the scanner to obtain an original preview image. The original preview image comprises a film image corresponding to the film. The original preview image additionally comprises pixels and each pixel has a first hue value, a second hue value, and a third hue value. The methods then select the pixels with luminance in a predetermined range from the original preview image to acquire a second preview image. Next, the method frames the second preview image according to the first hue values of the pixels to obtain an image frame. Finally, the method sections the image frame to recognize the film image.

BRIEF DESCRIPTION OF THE DRAWINGS

Embodiments of the present invention can be more fully understood by reading the subsequent detailed description and examples with references made to the accompanying drawings, wherein.

DETAILED DESCRIPTION

Methods and systems for performing automatic film recognition are disclosed. In some embodiments, at least some of the film recognition problems exhibited in conventional scanners are overcome. Also, in some embodiments, use of a film holder is not required or there are no limitations attributable to film placement.

Figure 1:
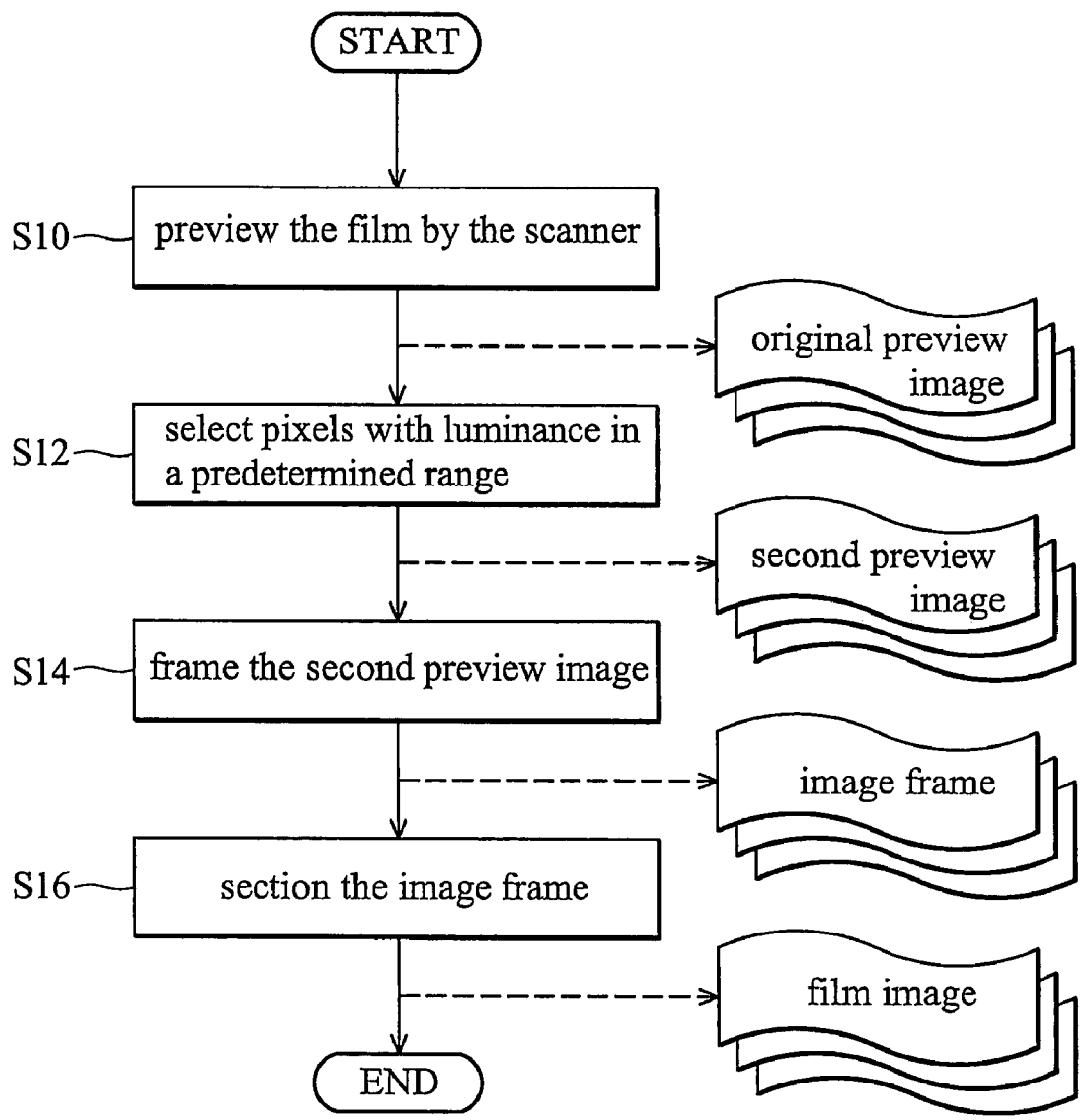
FIG. 1 is a flowchart of an embodiment of an automatic film recognition method.

FIG. 1 is a flowchart of an embodiment of an automatic film recognition method. First, the film is previewed by the scanner to obtain an original preview image comprising a film image corresponding to the film (step S10). The original preview image comprises pixels and each pixel has a first, a second, and a third hue value, i.e. RGB. Because the red hue value typically has the best transparency, the red hue value is selected as the first hue value for further calculation and analysis.

Next, the pixels with luminance in a predetermined range are selected from the original preview image to form a second preview image (step S12). The selection is made to eliminate portions of the original preview image that are outside an average luminance range.

Figure 2:
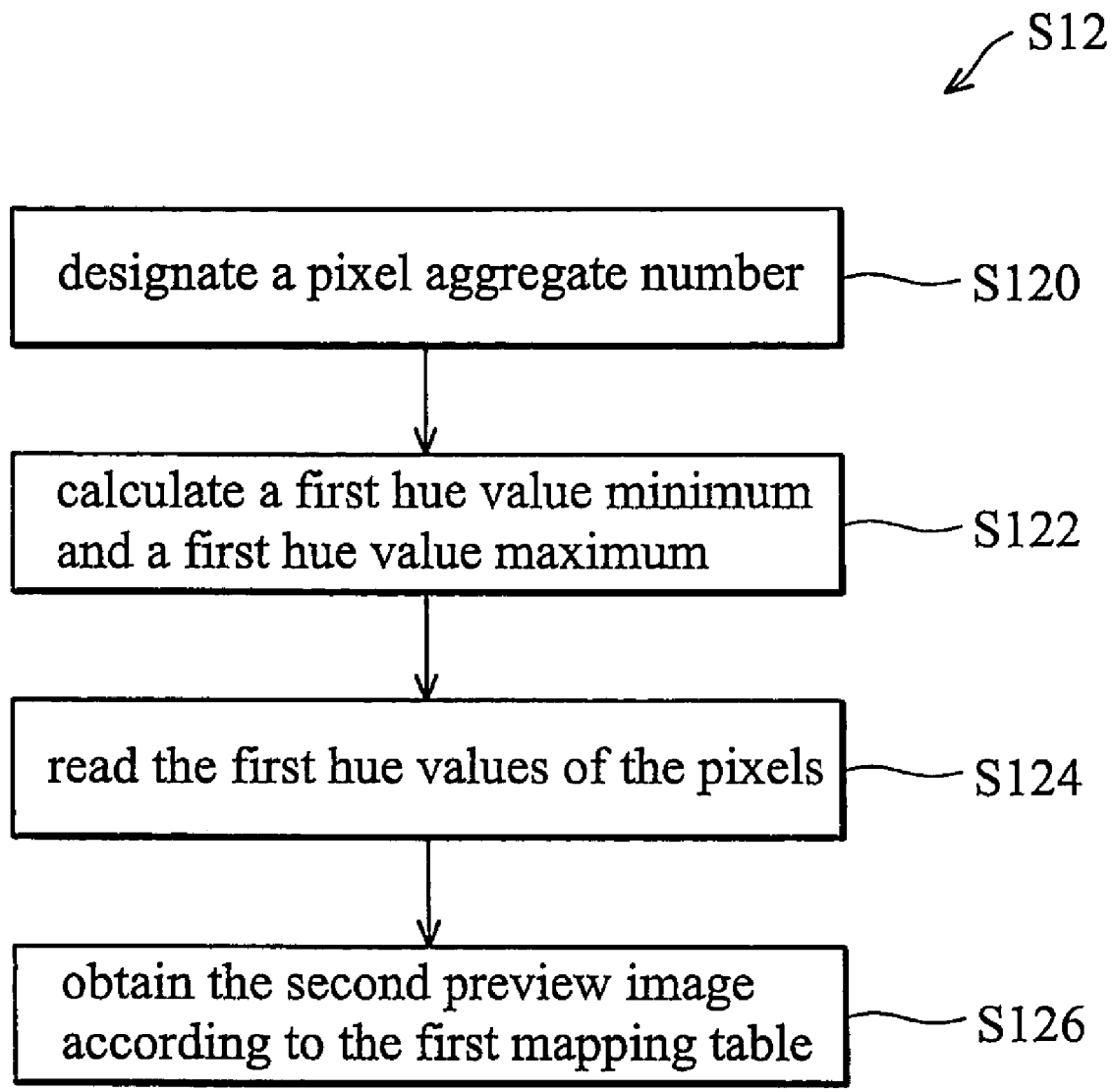
FIG. 2 is a flowchart of the pixel selection according to the embodiment of FIG. 1.

The mentioned pixel selection is accomplished by the steps depicted in the flowchart of FIG. 2. First, the pixels with first hue values within a predetermined range are selected. The range is determined according to a transparent character of the film. For example, the number of the selected pixels is next designated as a pixel aggregate number (step S120). Further calculation and analysis is based on the pixel aggregate number.

Figure 3:
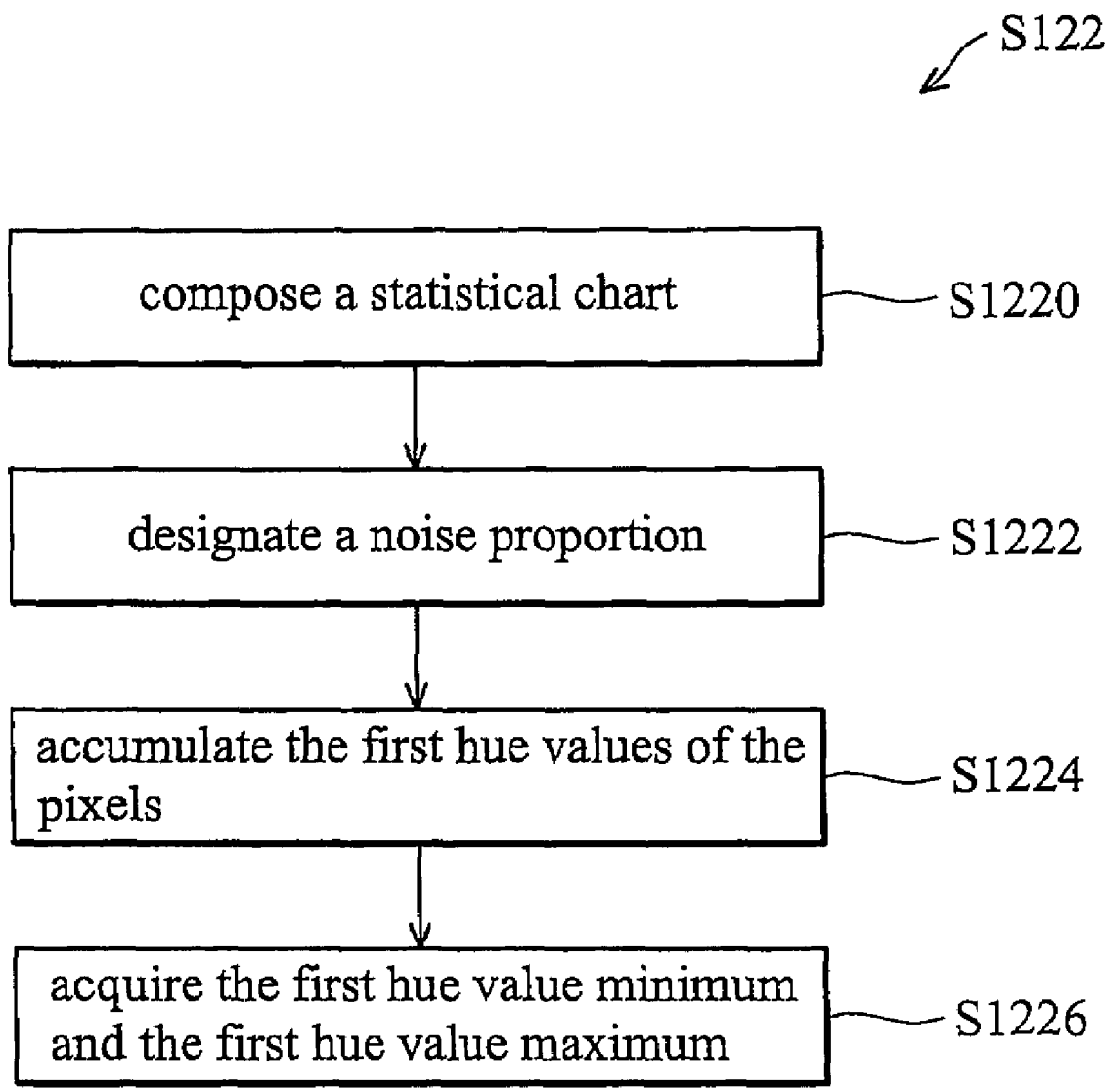
FIG. 3 is a flowchart of the first hue value designation according to the embodiment of FIG. 1.

FIG. 3 is a flowchart of the first hue value designation according to the embodiment of FIG. 1. A statistical chart is composed based on the first hue values of the pixels (step S1220) and a noise proportion is designated (step S1222). The first hue values of the pixels are accumulated according to the statistical chart and the noise proportion to acquire a first hue value minimum and a first hue value maximum (step S1224, S1226).

Figure 4:
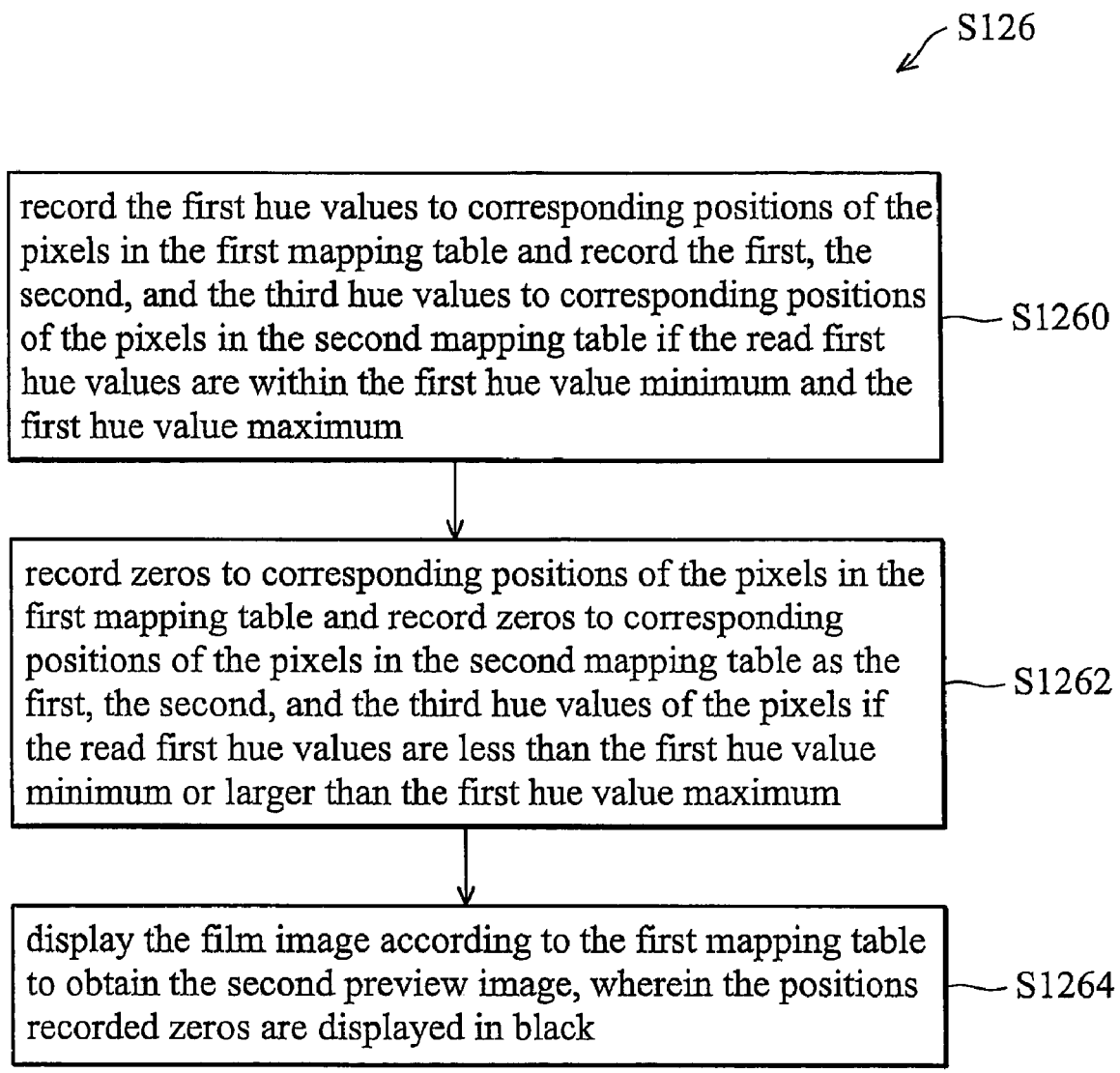
FIG. 4 is a flowchart of the mapping table production according to the embodiment of FIG. 1.

Two-dimensional storage spaces are allocated for a first mapping table and a second mapping table. Subsequently, referring to FIG. 2, the first hue values of the pixels are then read individually (step S124). FIG. 4 is a flowchart of the mapping table production according to the embodiment of FIG. 1. The first hue values are recorded to corresponding positions of the pixels in the first mapping table and the first, the second, and the third hue values are recorded to corresponding positions of the pixels in the second mapping table if the read first hue values are within the first hue value minimum and the first hue value maximum (step S1260).

Zeros are recorded to corresponding positions of the pixels in the first mapping table and zeros are also recorded to corresponding positions of the pixels in the second mapping table as the first, the second, and the third hue values of the pixels if the read first hue values are less than the first hue value minimum or larger than the first hue value maximum (step S1262).

Finally, the film image is displayed according to the first mapping table to obtain the second preview image, wherein the positions recorded as zeros are displayed in black (step S1264).

Figure 5:
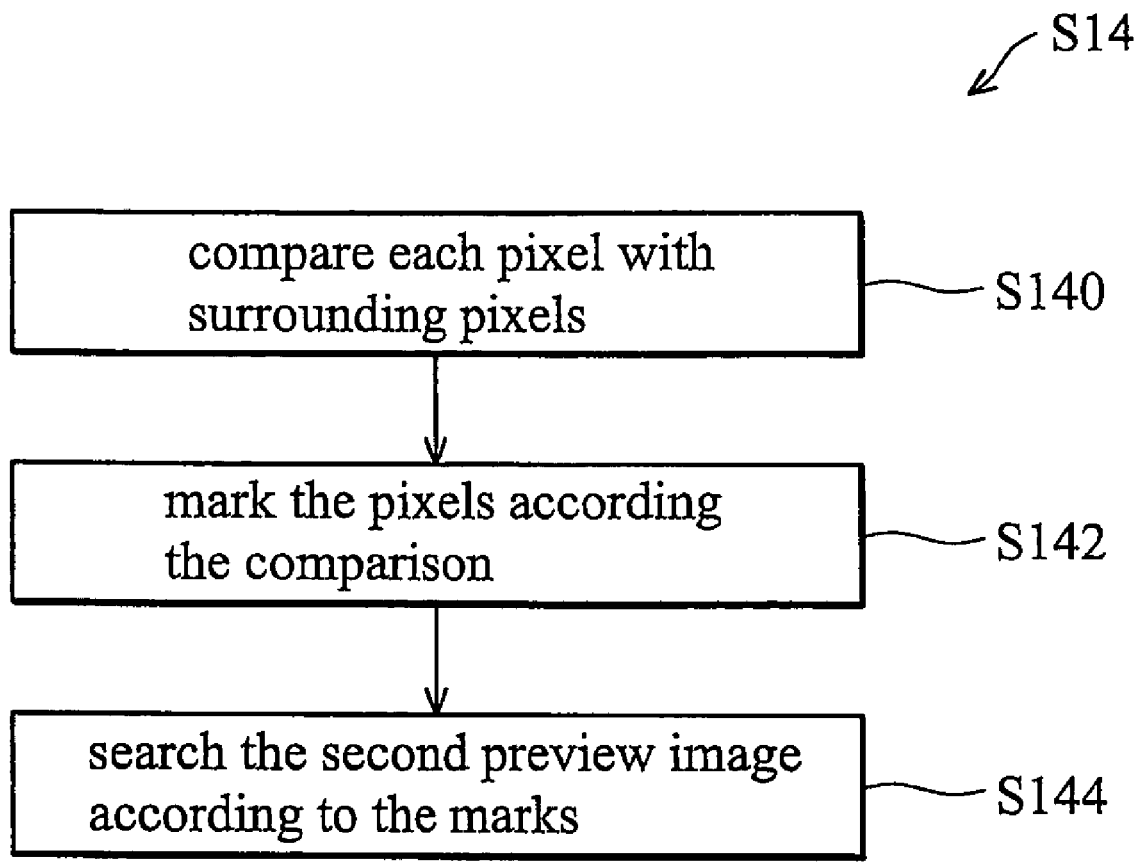
FIG. 5 is a flowchart of the image framing according to the embodiment of FIG. 1.

Referring again to FIG. 1, after the pixel selection (step S12), the second preview image is acquired. The second preview image is then framed according to the first hue values of the pixels to obtain an image frame (step S14). The framing is accomplished a framing process, an example of which is depicted in FIG. 5. As shown in FIG. 5, each pixel is compared with surrounding pixels according to the first, the second, and the third hue values of the pixels (step S140). The pixels are then marked according the comparison (step S142). For example, a pixel that is different than surrounding pixels above a predetermined degree is marked as 1, and otherwise marked as 0. The second preview image is searched to obtain the image frame according to the marks. The search can be a Breadth-First Search (BFS) (step S144).

Referring once again to FIG. 1, after the second preview image is framed, the image frame is finally sectioned to recognize the film image (step S16). Generally, the film is either positive film or negative film. Due to the difference between positive film and negative film, the detailed steps of the sectioning are different.

Figure 6:
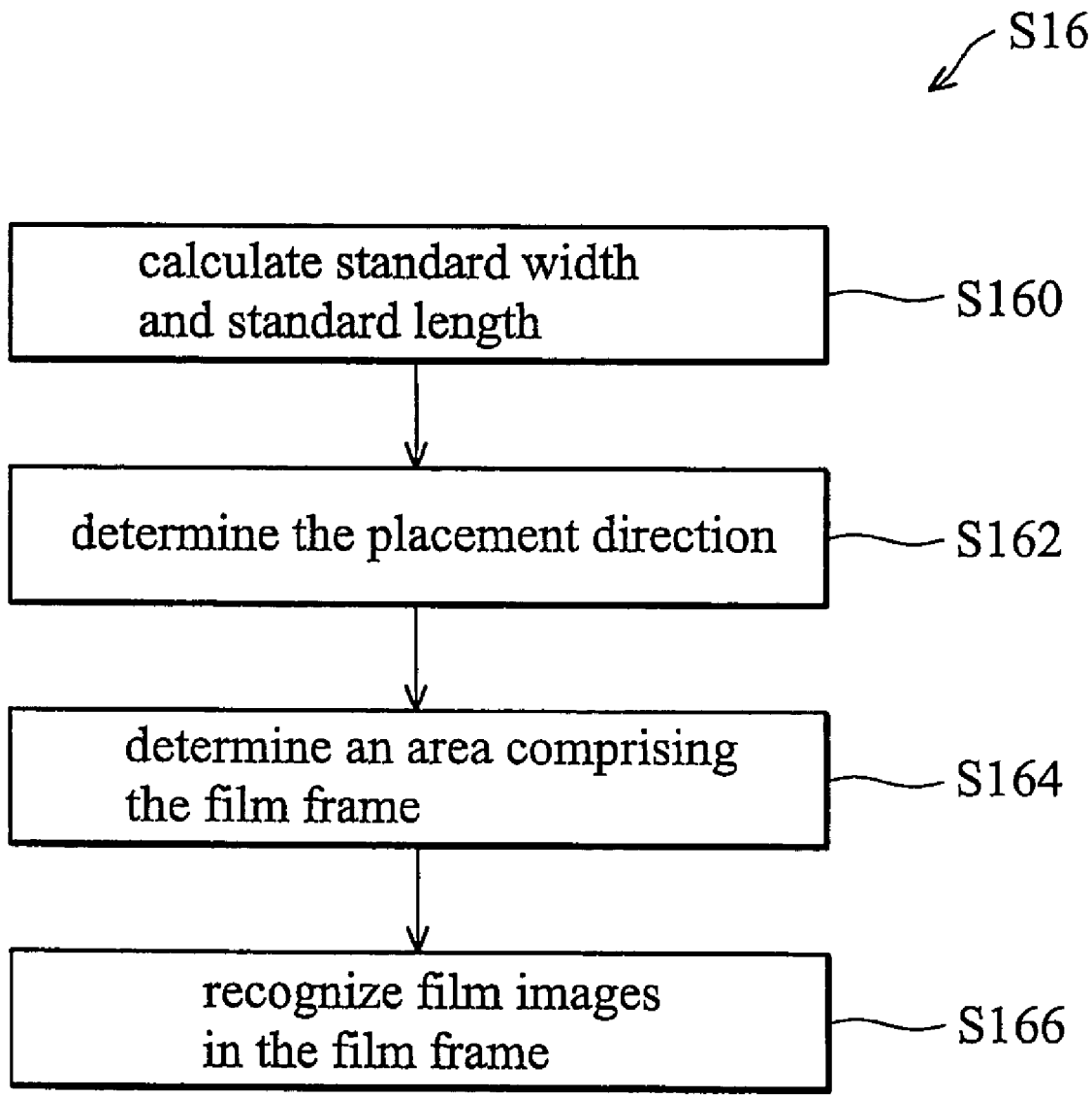
FIG. 6 is a flowchart of the image sectioning according to the embodiment of FIG. 1.

FIG. 6 is a flowchart of the image sectioning according to the embodiment of FIG. 1. If the film is a negative film, the obtained image frame has an image width W and an image length L. The image frame comprises a film frame and a saw-toothed frame. The film frame comprises a first negative film image, a second negative film image, and an interval.

A standard width W1 of each negative film image, a standard length H1 of each negative film image, and an interval width S of the interval are calculated according to the film size and a preview resolution of the scanner, wherein W1<H1 (step S160). The film size is the actual size of a negative film, unchanged generally. The preview resolution is a parameter of a scanner for scanning a film.

The placement direction of each negative film image in the image frame is determined according to the image width W and the image length L (step S162). The area comprising the film frame is determined according to the placement direction, the standard width W1, and the first hue values of the pixels in the image frame (step S164). Specifically, if the placement direction is widthways, a template is composed with the standard width W1 and the image Length L and the template is moved in the image frame in the lengthwise direction until the sum of the first hue values of the pixels reaches a maximum to determine the area of the film frame. The mentioned step disregards the saw-toothed frame. If the film does not include a saw-toothed frame, the mentioned step can be performed without affecting and the film frame will be framed more delicately.

The first and the second negative film images in the film frame are recognized according to the standard width W1, the standard length H1, the interval width S, and the first hue values of the pixels of the film frame (step S166).

Specifically, if L<=((H1+S)+2×S)), the film frame comprises a first negative film image. A template conforming to the standard width W1 and the standard length H1 is composed. The template is moved in the film frame until the sum of the first hue values of the pixels reaches a maximum to determine the first negative file image. If L>((H1+S)+2×S), the film frame comprises first and second negative film images, and an interval. A template conforming to the standard width W1 and the interval width S is composed. The template is moved in the film frame until the sum of the first hue values of the pixels reaches a minimum to determine the first and the second negative film images.

Subsequently, an area of the film frame with an average first hue value out of a predetermined range is deleted to reduce errors. For example, the shape of a film holder is similar to the film placed therein, thus, the film holder can be disregarded through the mentioned deletion.

Referring to step S14, the step occurs subsequent to framing of the second preview image. The image frame is finally sectioned for recognition of the film image (step S16). If the film is a positive film, the obtained image frame comprises a positive film image and a space around the image. The image frame is sized with a frame width W and a frame length H. A standard width W2 and a standard length H2 of the positive film image are calculated according to the film size and a preview resolution of the scanner, wherein W2<H2 (step S160). Here, again, the film size is the actual size of a positive film and the preview resolution is a parameter produced by the scanner.

A placement direction of the positive film image in the image frame is determined according to the frame width W, the frame length H, the standard width W2, the standard length H2, and the first hue values of the pixels in the image frame (step S162).

Determination of the placement direction can be accomplished by the following exemplary steps. First, a template conforming to the standard width W2 and the frame length H is composed. The template is moved in the image frame until the sum of the first hue values of the pixels reaches a maximum. The sum of the first hue value of the pixels is calculated as a first sum value. A template conforming to the standard width W2 and the frame width W is composed and then moved in the image frame until the sum of the first hue values of the pixels reaches a maximum. The first hue value of the pixels in the image frame is then calculated as a second sum value. If the first sum value is larger than the second sum value, the placement direction is determined as lengthwise, if not, widthways.

Subsequent to determination of the placement direction, the positive film image in the film frame is recognized according to the placement direction, the standard width W2, and the first hue values of the pixels in the image frame, that is, step S164 is skipped. If the placement direction is lengthwise, a template conforming to the standard width W2 and the frame length H is composed. The template is moved in the image frame in the widthways direction until the sum of the first hue values of the pixels reaches a maximum to determine a left margin and a right margin. A template conforming to the standard width W2 and the standard length H2 is composed and the template is moved in the image frame in the lengthwise direction until the sum of the first hue values of the pixels reaches a maximum to determine a top margin and a bottom margin for recognition of the positive film image.

If the placement direction is widthways, a template conforming to the standard width W2 and the frame width W is composed. The template is moved in the image frame in the lengthwise direction until the sum of the first hue values of the pixels reaches a maximum to determine a top margin and a bottom margin. Next, a template conforming to the standard width W2 and the standard length H2 is composed and the template is moved in the image frame in the widthways direction until the sum of the first hue values of the pixels reaches a maximum to determine a left margin and a right margin for recognizing the positive film image (step S166).

Similar to the negative film, an area of the film frame with an average first hue value out of a predetermined range is deleted.

In some embodiments, the inventive method can obtain the size or the placement position of a film in a scanner can be obtained regardless of whether or not a film holder is used. Thus, automatic film recognition for a scanner can be accomplished.

Figure 7:
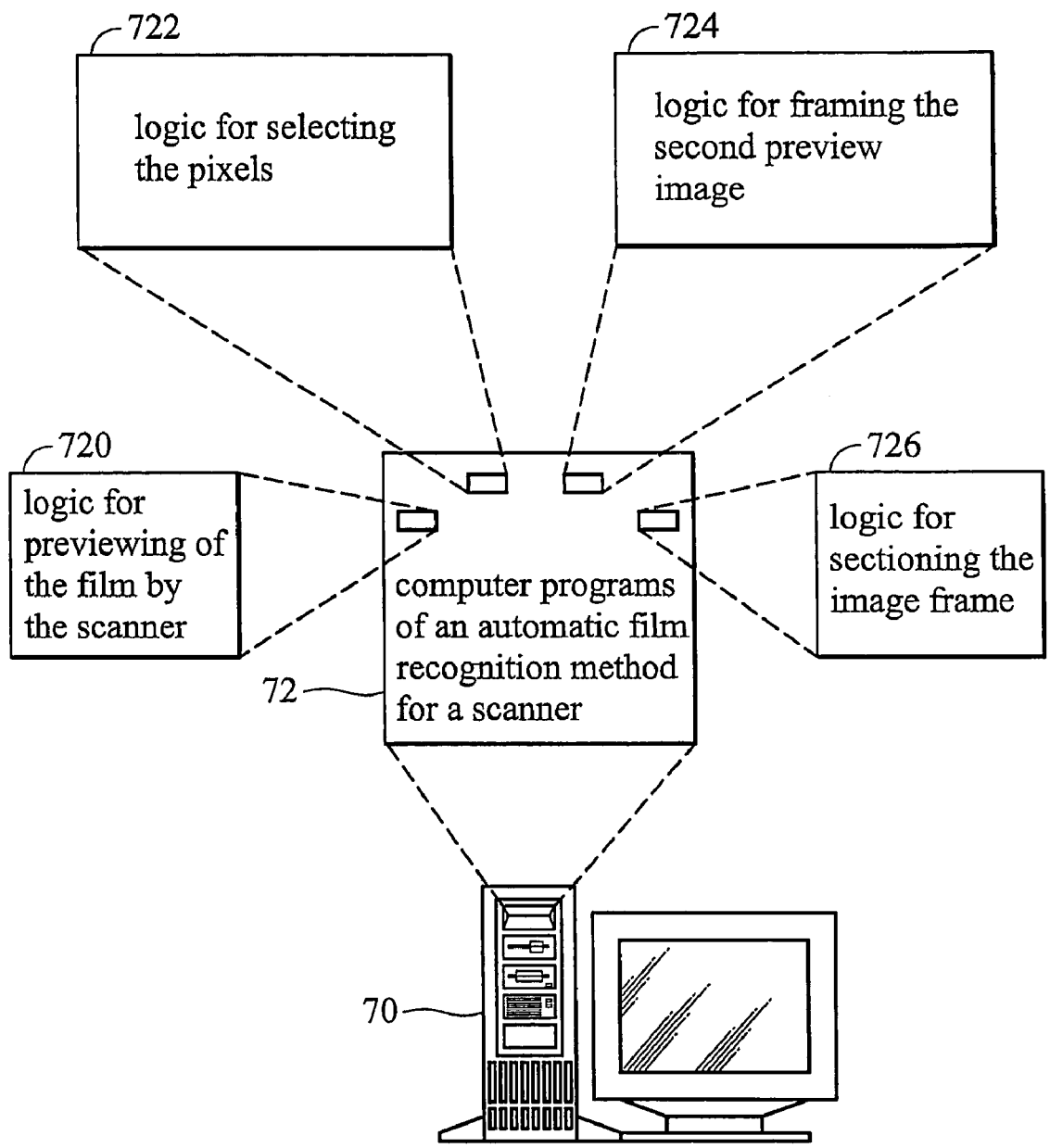
FIG. 7 is a diagram of an embodiment of a machine-readable storage medium for storing a computer program providing an automatic film recognition method.

Embodiments of machine-readable storage media for storing computer programs that provide automatic film recognition are disclosed. By way of example, such computer programs could implement methods such as those previously described. FIG. 7 is a diagram of an embodiment of a machine-readable storage medium for storing a computer program providing an automatic film recognition method. As shown in FIG. 7, machine-readable storage medium 70 stores a computer program 72. The computer program 72 mainly comprises logic for previewing of the film by the scanner 720, logic for selecting the pixels 722, logic for framing the second preview image 724, and logic for sectioning the image frame 726.

Figure 8:
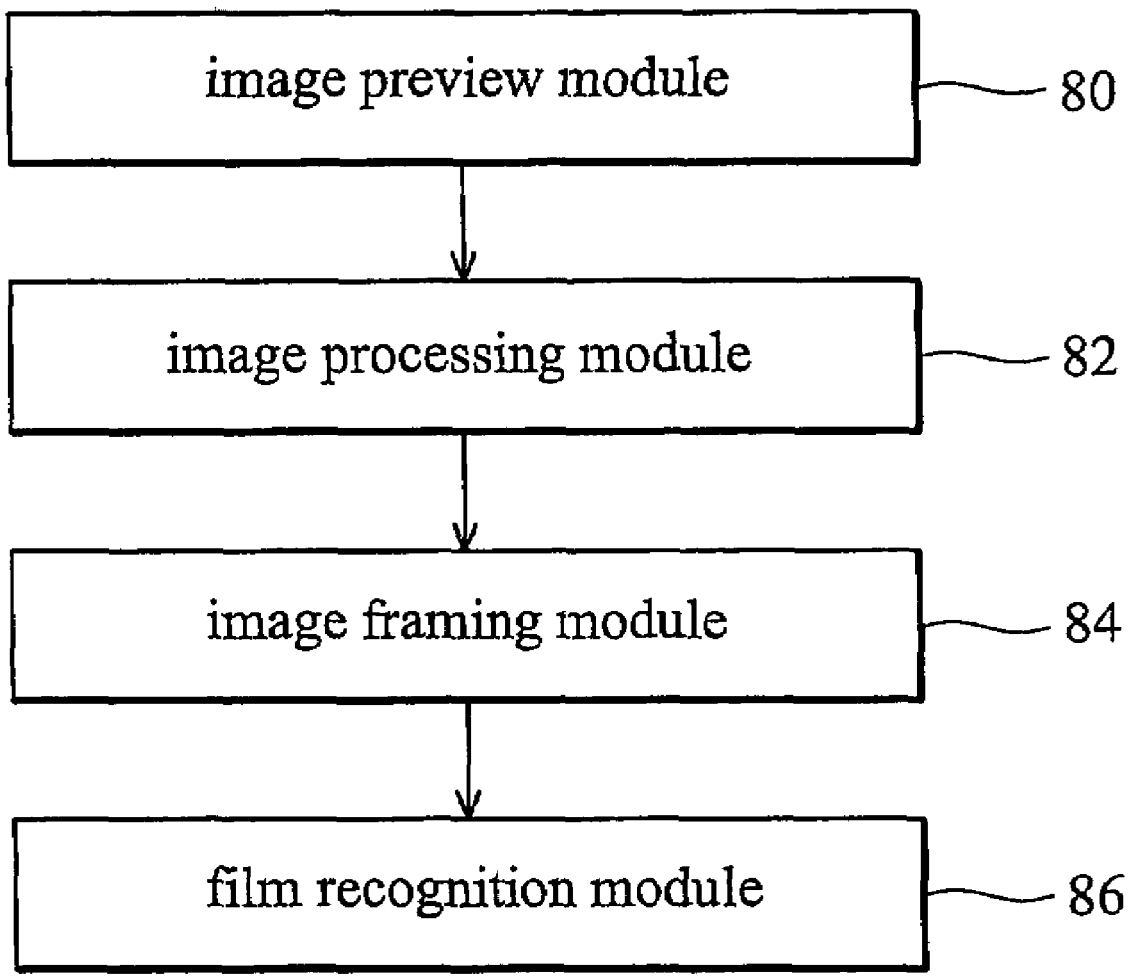
FIG. 8 is a diagram of an embodiment of a system for recognition.

An embodiment of a system for recognizing a film in a scanner is depicted in FIG. 8. As shown in FIG. 8, the system includes an image preview module 80, an image processing module 82, an image framing module 84, and a film recognition module 86.

The image preview module 80 previews the film using the scanner to obtain an original preview image. The original preview image comprises a film image corresponding to the film. The original preview image comprises pixels and each pixel has a first hue value, a second hue value, and a third hue value.

The image processing module 82 selects the pixels with luminance in a predetermined range from the original preview image to form a second preview image. The image processing module 82 further comprises a first, a second, a third, and a fourth image processing modules.

The first image processing module selects the pixels with the first hue values within a range. The range is determined according to a transparent character of the film. The first image processing module designates the number of the selected pixels as a pixel aggregate number.

The second image processing module calculates a first hue value minimum and a first hue value maximum according to the pixel aggregate number and the first hue values of the pixels. Specifically, the second image processing module composes a statistical chart based on the first hue values of the pixels, designates a noise proportion, and accumulates the first hue values of the pixels according to the statistical chart and the noise proportion to acquire the first hue value minimum and the first hue value maximum.

The third image processing module reads the first hue values of the pixels individually. The fourth image processing module produces a first mapping table according to the read first hue values of the pixels to acquire the second preview image.

Specifically, if the read first hue values are within the first hue value minimum and the first hue value maximum, the fourth image processing module records the first hue values of the pixels to corresponding positions in the first mapping table. Further, the fourth image processing module records the first, the second, and the third hue values of the pixels to corresponding positions in a second mapping table.

If the read first hue values are less than the first hue value minimum or larger than the first hue value maximum, the fourth image processing module records zeros to corresponding positions of the pixels in the first mapping table and records zeros to corresponding positions of the pixels as the first, the second, and the third hue values of the pixels in the second mapping table. The first and the second mapping tables are stored in two-dimensional storage spaces. The fourth image processing module also displays the film image according to the first mapping table to obtain the second preview image, wherein the positions recorded zeros are displayed in black.

The image framing module 84 frames the second preview image according to the first hue values of the pixels to obtain an image frame. The image framing module 84 further comprises a first image framing module, a second image framing module, and a third image framing module.

The first image framing module compares each pixel with surrounding pixels according to the first, the second, and the third hue values of the pixels. The second image framing module marks each pixel according the comparison. The third image framing module searches the second preview image according to the marks to obtain the image frame. The search executed by the third image framing module can be a Breadth-First Search.

The film recognition module 86 sections the image frame to recognize the film image. Generally, the film can be a negative film or a positive film.

If the film is a negative film, the image frame obtained by the image framing module 84 is sized with an image width W and an image length L. The image frame comprises a film frame and a saw-toothed frame. The film frame comprises a first negative film image, a second negative film image, and an interval. The film recognition module 86 further comprises a first, a second, a third, and a fourth negative film recognition modules.

The first negative film recognition module calculates a standard width W1 and a standard length H1 of each negative film image, and an interval width S of the interval according to the film size and a preview resolution of the scanner, wherein W1<H1. The second negative film recognition module determines a placement direction of each negative film image in the image frame according to the image width W and the image length L.

The third negative film recognition module determines an area comprising the film frame according to the placement direction, the standard width W1, and the first hue values of the pixels in the image frame. The third negative film recognition module composes a template conforming to the standard width W1 and the image Length L, and moves the template in the lengthwise direction until the sum of the first hue values of the pixels reaches a maximum to determine the film frame.

The fourth negative film recognition module recognizes the first and the second negative film images in the film frame according to the standard width W1, the standard length H1, the interval width S, and the first hue values of the pixels of the film frame. The fourth negative film recognition module further deletes an area of the film frame with an average first hue value out of a predetermined range.

The fourth negative film recognition module recognizes the first and the second negative film images by executing the following steps.

If L<=((H1+S)+2×S)), the film frame has the first negative film image. A template conforming to the standard width W1 and the standard length H1 is composed. The template is moved in the film frame until the sum of the first hue values of the pixels reaches a maximum to recognize the first negative file image.

If L>((H1+S)+2×S), the film frame has the first negative film image, the second negative film image, and the interval. A template conforming to the standard width W1 and the interval width S is composed. The template is moved in the film frame until the sum of the first hue values of the pixels reaches a minimum to recognize the first negative file image. The other negative film images can be recognized accordingly.

If the film is a positive film, the image frame obtained by the image framing module is sized with a frame width W and a frame length H. The image frame comprises a positive film image and a space around the image. The film recognition module further comprises a first positive film recognition module, a second positive film recognition module, and a third positive film recognition module.

The first positive film recognition module calculates a standard width W2 and a standard length H2 of the positive film according to the film size and a preview resolution of the scanner, wherein W2<H2.

The second positive film recognition module determines a placement direction of the positive film image in the image frame according to the frame width W, the frame length H, the standard width W2, the standard length H2, and the first hue values of the pixels. The second positive film recognition module composes a template with the standard width W2 and the frame length H and moves the template in the image frame until the sum of the first hue values of the pixels reaches a maximum. The first values of the pixels in the image frame are calculated as a first sum value. The second positive film recognition module further composes a template with the standard width W2 and the frame width W and moves the template in the image frame until the sum of the first hue values of the pixels reaches a maximum. The first hue values of the pixels in the image frame are calculated as a second sum value. If the first sum value is larger than the second sum value, the placement direction is determined as lengthwise, if not, widthways.

The third positive film recognition module recognizes the positive film image in the film frame according to the placement direction, the standard width W2, and the first hue values of the pixels in the image frame. If the placement direction is lengthwise, the third positive film recognition module composes a template conforming to the standard width W2 and the frame length H. The template is moved in the image frame in the widthways direction until the sum of the first hue values of the pixels reaches a maximum to determine a left margin and a right margin. The third positive film recognition module further composes a template sized with the standard width W2 and the standard length H2 and moves the template in the image frame in the lengthwise direction until the sum of the first hue values of the pixels reaches a maximum to determine a top margin and a bottom margin. The third positive film recognition module recognizes the positive image according to the determined margins.

If the placement direction is widthways, the third positive film recognition module composes a template conforming to the standard width W2 and the frame width W and moves the template in the image frame in the lengthwise direction until the sum of the first hue values of the pixels reaches a maximum to determine a top margin and a bottom margin. The third positive film recognition module further composes a template conforming to the standard width W2 and the standard length H2 and moves the template in the image frame in the widthways direction until the sum of the first hue values of the pixels reaches a maximum to determine a left margin and a right margin. The third positive film recognition module recognizes the positive film image according to the determined margins. Additionally, the third positive film recognition module further deletes an area of the film frame with an average first hue value out of a predetermined range.

Figure 9:
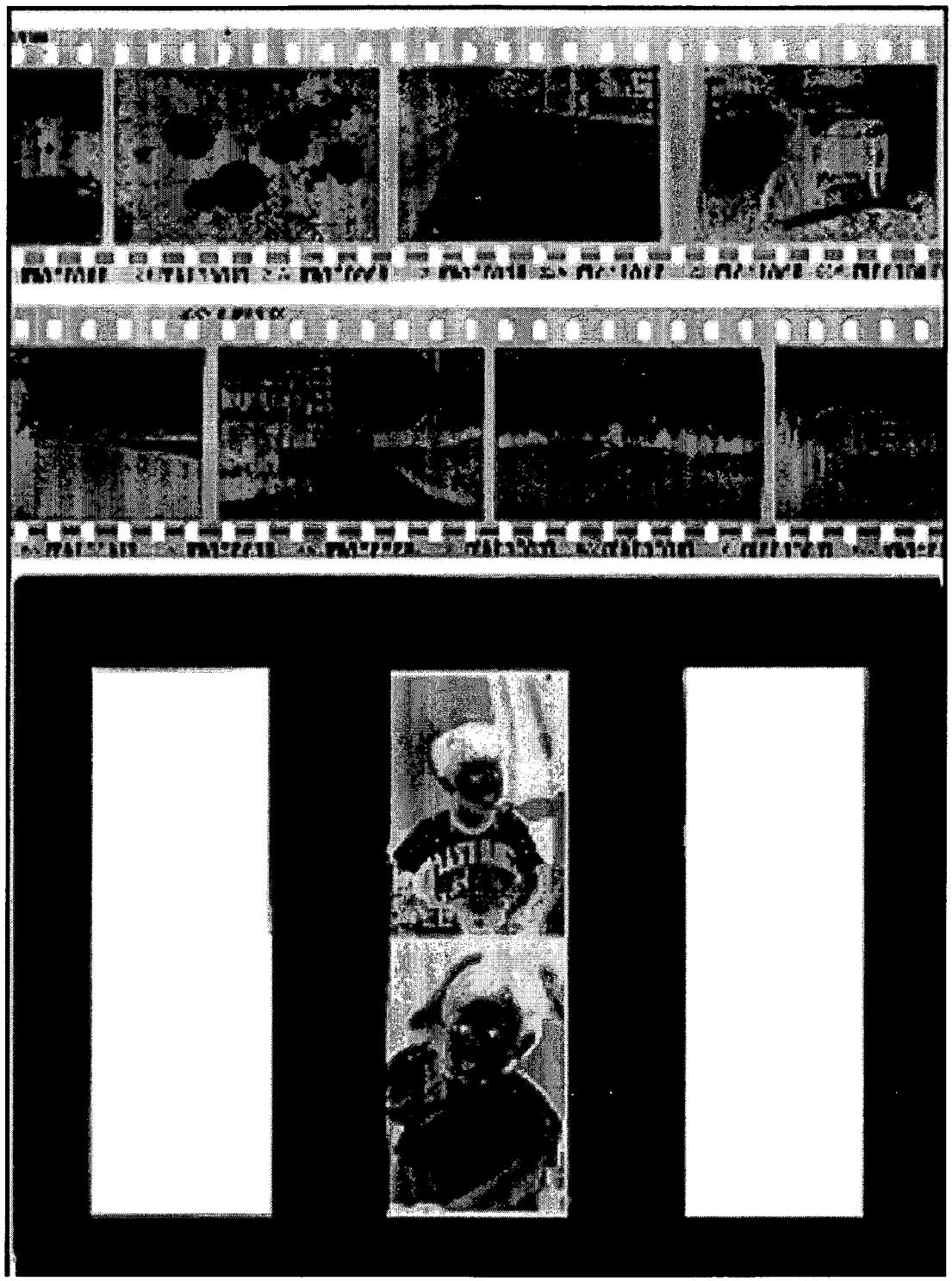
FIG. 9 is a diagram of an original preview image provided by another embodiment.

FIG. 9 is a diagram of an original preview image provided by another embodiment. In this example, a film is scanned by the scanner without using a film holder.

The original preview image comprises pixels. Each pixel has a first, a second, and a third hue value, e.g. RGB. In this embodiment, the red hue value is chosen as the first hue value due to better transparency thereof.

Next, the pixels with first hue values within a predetermined range are selected. The range is determined according to a transparent characteristic of the film. The number of the selected pixels is designated as a pixel aggregate number. A statistical chart is composed from the first hue values of the pixels and a noise proportion is designated. The first hue values of the pixels are accumulated according to the statistical chart and the noise proportion to acquire the first hue value minimum and the first hue value maximum.

Figure 10:
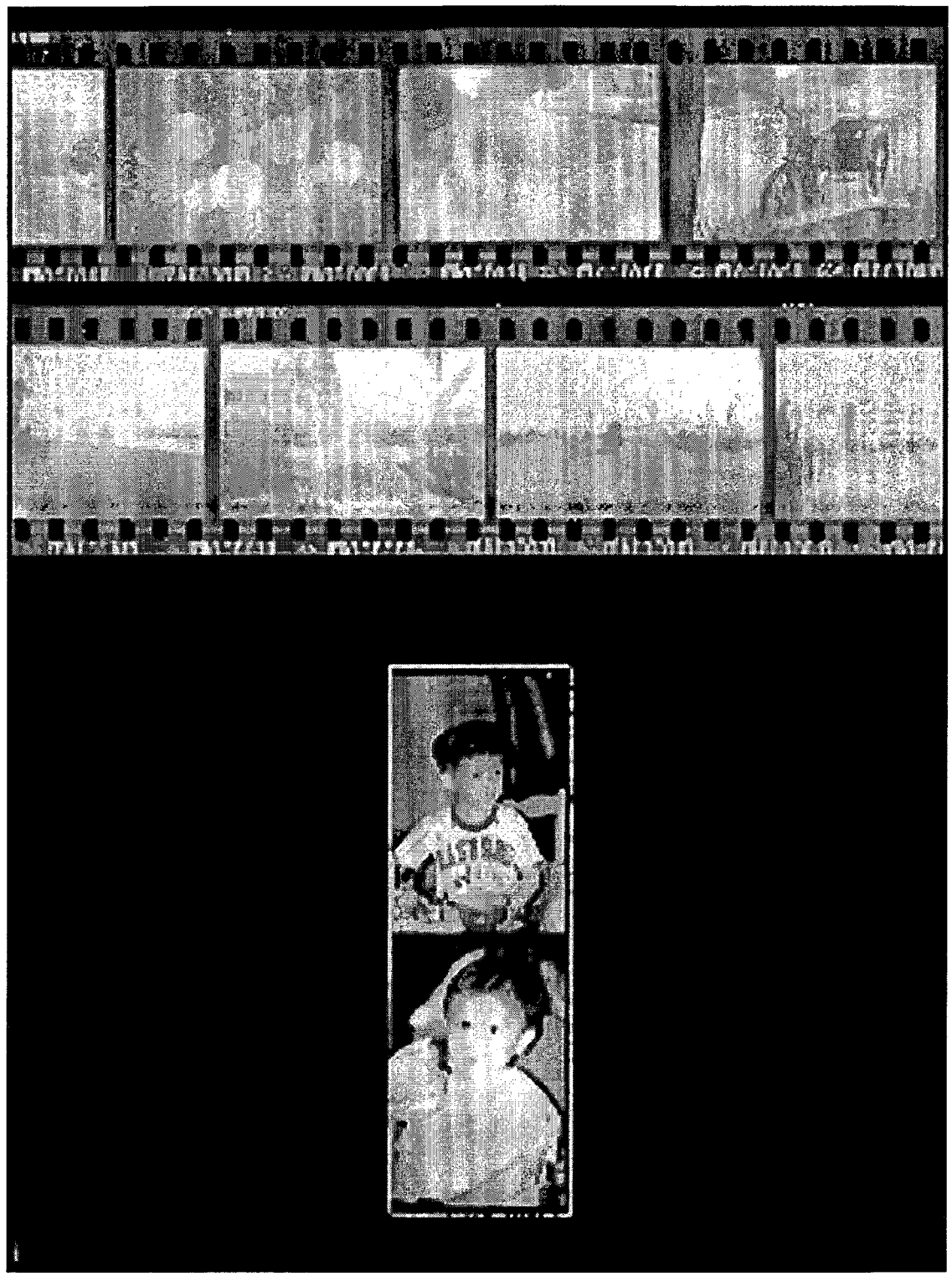
FIG. 10 is a diagram of a second preview image provided by another embodiment.

Two-dimensional storage spaces are then allocated for a first mapping table and a second mapping table. The first hue values of the pixels are then read individually. If the read first hue values are within the first hue value minimum and the first hue value maximum, the first hue values are recorded to corresponding positions of the pixels in the first mapping table and the first, the second, and the third hue values are recorded to corresponding positions of the pixels in the second mapping table. If the read first hue values are less than the first hue value minimum or larger than the first hue value maximum, zeros are recorded to corresponding positions of the pixels in the first mapping table and zeros are recorded to corresponding positions of the pixels as the first, the second, and the third hue values of the pixels in the second mapping table. The film image is displayed according to the first mapping table to obtain the second preview image, wherein the positions recorded zeros are displayed in black, as shown in FIG. 10.

Figure 11:
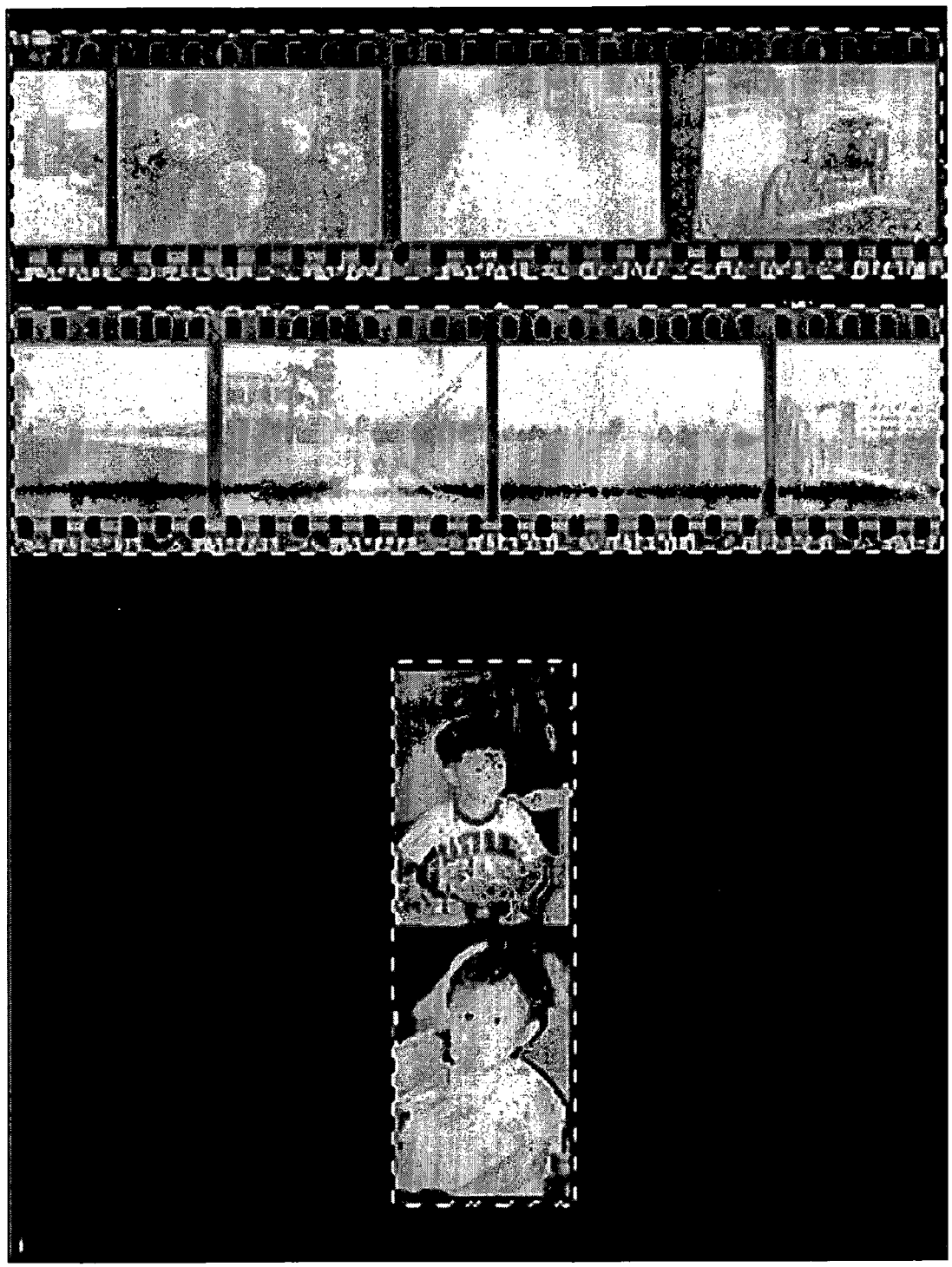
FIG. 11 is a diagram of the image framing provided by another embodiment.

Each pixel is compared with surrounding pixels according to the first, the second, and the third hue values of the pixels. The pixels are marked according to the comparison. The second preview image is searched by a Breadth-First Search to frame the image frame according to the marks, as shown in FIG. 11.

Finally, the image frame is sectioned to recognize the film image. The film utilized in this embodiment is a negative film. The obtained image frame is sized with an image width W and an image length L. The image frame comprises a film frame and a saw-toothed frame. The film frame comprises negative film images and intervals.

A standard width W1 of each negative film image, a standard length H1 of each negative film image, and an interval width S of the interval are calculated according to the film size and a preview resolution of the scanner (W1<H1). A placement direction of the negative film image in the image frame is determined according to the image width W and the image length L. A template conforming to the standard width W1 and the image Length L is composed and then moved in the image frame in the widthways direction until the sum of the first hue values of the pixels reaches a maximum to determine the area of the film frame, as shown in the top of FIG. 11. The mentioned step deletes the saw-toothed frame. If the negative film has no saw-toothed frames, the mentioned step can be performed in the same manner, as shown in the bottom of FIG. 11.

In this embodiment, each film frame includes several negative images, thus, (the image length L)>((the standard length H1+the interval width S)+2×the interval width S). A template conforming to the standard width W1 and the interval width S is composed. The template is moved in the film frame until the sum of the first hue values of the pixels reaches a minimum to determine the first negative file image. The other negative film images can be determined accordingly.

Figure 12:
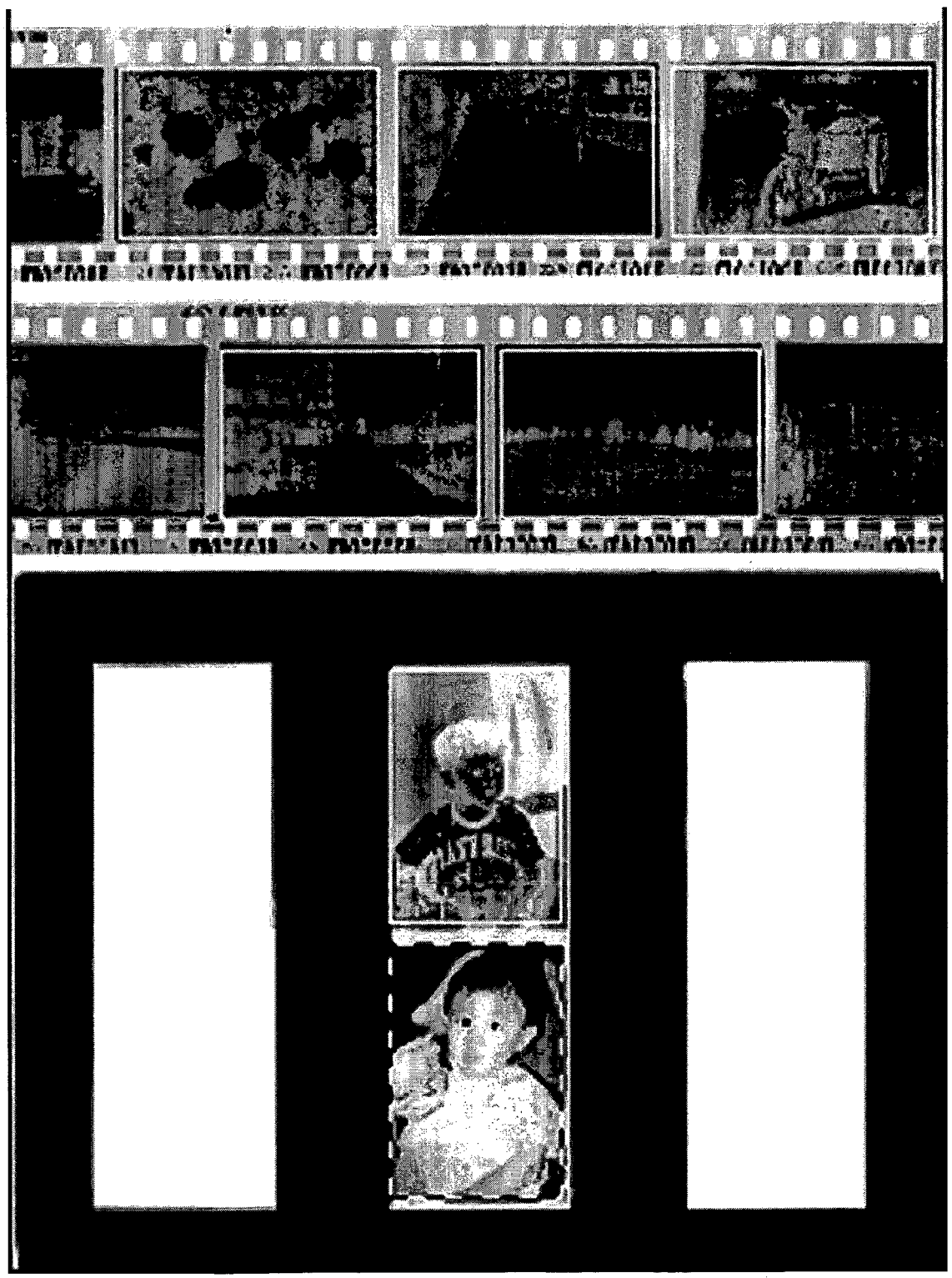
FIG. 12 is a diagram of the image sectioning provided by another embodiment.

Afterwards, an area of the film frame with average first hue value out of a predetermined range is deleted for reducing errors, as shown in FIG. 12. The result obtained in FIG. 12 is provided for selection of a desired image for further image processing.

Thus, embodiments of automatic film recognition methods and systems are provided that can acquire related information of a film placed in a scanner via analysis and calculation.

While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic film recognition method for recognizing a film in a scanner, comprising the steps of:
   (a) previewing the film using the scanner to obtain an original preview image comprising a film image corresponding to the film, wherein the original preview image comprises pixels and each pixel has a first hue value, a second hue value, and a third hue value;
   (b) selecting the pixels with luminance in a predetermined range from the original preview image to acquire a second preview image;
   (c) framing the second preview image according to the first hue values of the pixels to obtain an image frame; and
   (d) sectioning the image frame to recognize the film image.

2. The method as claimed in claim 1, wherein the step (b) further comprises the steps of:
   (b1) designating the number of pixels as a pixel aggregate number;
   (b2) calculating a first hue value minimum and a first hue value maximum according to the pixel aggregate number and the first hue values of the pixels;
   (b3) reading the first hue values of the pixels; and
   (b4) producing a first mapping table according to the read first hue values of the pixels to acquire the second preview image.

3. The method as claimed in claim 2, wherein the step (b1) further selects the pixels with first hue values within a range, wherein the range is determined according to a transparent character of the film.

4. The method as claimed in claim 2, wherein the step (b2) further comprises the steps of:
   (b21) composing a statistical chart based on the first hue values of the pixels;
   (b22) designating a noise proportion; and
   (b23) accumulating the first hue values of the pixels according to the statistical chart and the noise proportion to acquire the first hue value minimum and the first hue value maximum.

5. The method as claimed in claim 2, wherein the step (b4) further comprises the steps of:
   (b41) recording the first hue values to corresponding positions of the pixels in the first mapping table if the first hue values are within the first hue value minimum and the first hue value maximum;
   (b42) recording zeros to corresponding positions of the pixels in the first mapping table if the first hue values are less than the first hue value minimum or larger than the first hue value maximum; and
   (b43) displaying the film image according to the first mapping table to acquire the second preview image, wherein the positions of recorded zeros are displayed in black.

6. The method as claimed in claim 5, wherein the step (b41) further records the first, the second, and the third hue values to corresponding pixel positions in a second mapping table if the read first hue values are within the first hue value minimum and the first hue value maximum, and the step (b42) further records zeros to corresponding pixel positions in the second mapping table as the first, the second, and the third hue values of the pixels if the first hue values are less than the first hue value minimum or larger than the first hue value maximum.

7. The method as claimed in claim 6, wherein the second mapping table is stored in a two-dimensional storage space.

8. The method as claimed in claim 6, wherein the first hue values of the pixels are red hue values.

9. The method as claimed in claim 2, wherein the first mapping table is stored in a two-dimensional storage space.

10. The method as claimed in claim 1, wherein the step (c) further comprises the steps of:
    (c1) comparing each pixel with surrounding pixels according to the first, the second, and the third hue values;
    (c2) marking each pixel according to the comparison; and
    (c3) searching the second preview image according to the marks to obtain the image frame.

11. The method as claimed in claim 10, wherein the search in step (c3) is a Breadth-First Search.

12. The method as claimed in claim 1, wherein when the film is a negative film, the image frame obtained in step (c) is sized with an image width W and an image length L and comprises a film frame and a saw-toothed frame, wherein the film frame comprises a first negative film image, a second negative film image, and an interval, wherein the step (d) further comprises the steps of:
    (d11) calculating a standard width W1 and a standard length H1 of each negative film image, and calculating an interval width S of the interval according to the film size and a preview resolution of the scanner, wherein W1<H1;
    (d12) determining a placement direction of each negative film image in the image frame according to the image width W and the image length L;
    (d13) determining an area comprising the film frame according to the placement direction, the standard width W1, and the first hue values of the pixels in the image frame; and
    (d14) recognizing the first and the second negative film images in the film frame according to the standard width W1, the standard length H1, the interval width S, and the first hue values of the pixels of the film frame.

13. The method as claimed in claim 12, wherein the step (d14) further deletes an area of the film frame with an average first hue value out of a predetermined range.

14. The method as claimed in claim 12, wherein if the placement direction is widthways, the step (d13) further composes a template conforming to the standard width W1 and the image Length L and moves the template in the image frame in the lengthwise direction until the sum of the first hue values of the pixels reaches a maximum to determine the area comprising the film frame.

15. The method as claimed in claim 12, wherein the step (d14) further comprises the steps of:
    (d141) when L<=((H1+S)+2×S), the film frame comprising a first negative film image, composing a template conforming to the standard width W1 and the standard length H1 and moving the template in the film frame until the sum of the first hue values of the pixels reaches a maximum to determine the first negative file image; and
    (d142) when L>((H1+S)+2×S), the film frame comprising the first film image, the second negative film image, and the interval, composing a template conforming to the standard width W1 and the interval width S and moving the template in the film frame until the sum of the first hue values of the pixels reaches a minimum to determine the first negative film image and the second negative film image.

16. The method as claimed in claim 1, when the film is a positive film, the image frame obtained in step (c) is sized with a frame width W and a frame length H, and comprises a positive film image and a space around the image, wherein the step (d) further comprises the steps of:
  (d21) calculating a standard width W2 and a standard length H2 of the positive film image according to the film size and a preview resolution of the scanner, wherein W2<H2;
  (d22) determining a placement direction of the positive film image in the image frame according to the frame width W, the frame length H, the standard width W2, the standard length H2, and the first hue values of the pixels; and
  (d23) recognizing the positive film image in the film frame according to the placement direction, the standard width W2, and the first hue values of the pixels in the image frame.

17. The method as claimed in claim 16, wherein the step (d23) further deletes an area of the film frame with an average first hue value of the pixels out of a predetermined range.

18. The method as claimed in claim 16, wherein the step (d22) further comprises the steps of:
  (d221) composing a template conforming to the standard width W2 and the frame length H and moving the template in the image frame until the sum of the first hue values of the pixels reaches a maximum;
  (d222) accumulating the first hue values of the pixels in the image frame as a first sum value;
  (d223) composing a template conforming to the standard width W2 and the frame width W and moving the template in the image frame until the sum of the first hue values of the pixels reaches a maximum;
  (d224) accumulating the first hue values of the pixels in the image frame as a second sum value; and
  (d225) determining the placement direction, as lengthwise if the first sum value is larger than the second sum value, if not, widthways.

19. The method as claimed in claim 18, if the placement direction is lengthwise, the step (d23) further composes a template conforming to the standard width W2 and the frame length H and moves the template in the image frame in the widthways direction until the sum of the first hue values of the pixels reaches a maximum to determine a left margin and a right margin for recognizing the positive film image.

20. The method as claimed in claim 19, if the placement direction is lengthwise, the step (d23) further composes a template conforming to the standard width W2 and the standard length H2 and moves the template in the image frame in the lengthwise direction until the sum of the first hue values of the pixels reaches a maximum to determine a top margin and a bottom margin for recognizing the positive film image.

21. The method as claimed in claim 18, if the placement direction is widthways, the step (d23) further composes a template conforming to the standard width W2 and the frame width W and moves the template in the image frame in the lengthwise direction until the sum of the first hue values of the pixels reaches a maximum to determine a top margin and a bottom margin for recognizing the positive film image.

22. The method as claimed in claim 21, if the placement direction is widthways, the step (d23) further composes a template conforming to the standard width W2 and the standard length H2 and moves the template in the image frame in the widthways direction until the sum of the first hue values of the pixels reaches a maximum to determine a left margin and a right margin for recognizing the positive film image.

23. A machine-readable storage medium for storing, a computer program providing an automatic film recognition method for recognizing a film in a scanner, the method comprising the steps of:
  (a) previewing the film using the scanner to obtain an original preview image comprising a film image corresponding to the film, wherein the original preview image comprises a plurality of pixels and each pixel has a first hue value, a second hue value, and a third hue value;
  (b) selecting the pixels with luminance in a predetermined range from the original preview image to acquire a second preview image;
  (c) framing the second preview image according to the first hue values of the pixels to obtain an image frame; and
  (d) sectioning the image frame to recognize the film image.

24. The machine-readable storage medium as claimed in claim 23, wherein the step (b) further comprises the step of:
  (b1) designating the number of the pixels as a pixel aggregate number;
  (b2) calculating a first hue value minimum and a first hue value maximum according to the pixel aggregate number and the first hue values of the pixels;
  (b3) reading the first hue values of the pixels individually; and
  (b4) producing a first mapping table according to the read first hue values of the pixels to acquire the second preview image.

25. The machine-readable storage medium as claimed in claim 24, wherein the step (b1) further selects the pixels with first hue values within a range, wherein the range is determined according to a transparent character of the film.

26. The machine-readable storage medium as claimed in claim 24, wherein the step (b2) further comprises the steps of:
  (b21) composing a statistical chart based on the first hue values of the pixels;
  (b22) designating a noise proportion; and
  (b23) accumulating the first hue values of the pixels according to the statistical chart and the noise proportion to acquire the first hue value minimum and the first hue value maximum.

27. The machine-readable storage medium as claimed in claim 24, wherein the step (b4) further comprises the steps of:
  (b41) recording the first hue values to corresponding positions of the pixels in the first mapping table if the first hue values are within the first hue value minimum and the first hue value maximum;
  (b42) recording zeros to corresponding positions of the pixels in the first mapping table if the first hue values are less than the first hue value minimum or larger than the first hue value maximum; and
  (b43) displaying the film image according to the first mapping table to acquire the second preview image, wherein the positions recorded zeros are displayed in black.

28. The machine-readable storage medium as claimed in claim 27, wherein the step (b41) further records the first, the second, and the third hue values to corresponding positions of the pixels in a second mapping table if the read first hue values are within the first hue value minimum and the first hue value maximum, and the step (b42) further records zeros to corresponding positions of the pixels in the second mapping table as the first, the second, and the third hue values of the pixels if the first hue values are less than the first hue value minimum or larger than the first hue value maximum.

29. The machine-readable storage medium as claimed in claim 28, wherein the second mapping table is stored in a two-dimensional storage space.

30. The machine-readable storage medium as claimed in claim 28, wherein the first hue values of the pixels are red hue values.

31. The machine-readable storage medium as claimed in claim 24, wherein the first mapping table is stored in a two-dimensional storage space.

32. The machine-readable storage medium as claimed in claim 23, wherein the step (c) further comprises:
   (c1) comparing each pixel with surrounding pixels according to the first, the second, and the third hue values;
   (c2) marking each pixel according the comparison; and
   (c3) searching the second preview image according to the marks to obtain the image frame.

33. The machine-readable storage medium as claimed in claim 32, wherein the search in step (c3) is a Breadth-First Search.

34. The machine-readable storage medium as claimed in claim 23, when the film is a negative film, the image frame obtained in step (c) is sized with an image width W and an image length L and comprises a film frame and a saw-toothed frame, wherein the film frame comprises a first negative film image, a second negative film image, and an interval, wherein the step (d) further comprises the steps of:
   (d11) calculating a standard width W1 and a standard length H1 of each negative film image, and calculating an interval width S of the interval according to the film size and a preview resolution of the scanner, wherein W1<H1;
   (d12) determining a placement direction of each negative film image in the image frame according to the image width W and the image length L;
   (d13) determining an area comprising the film frame according to the placement direction, the standard width W1, and the first hue values of the pixels in the image frame; and
   (d14) recognizing the first and the second negative film images in the film frame according to the standard width W1, the standard length H1, the interval width S, and the first hue values of the pixels of the film frame.

35. The machine-readable storage medium as claimed in claim 34, wherein the step (d14) further deletes an area of the film frame with an average first hue value of the pixels out of a predetermined range.

36. The machine-readable storage medium as claimed in claim 34, wherein if the placement direction is widthways, the step (d13) further composes a template conforming to the standard width W1 and the image Length L and moves the template in the image frame in the lengthwise direction until the sum of the first hue values of the pixels reaches a maximum to determine the area comprising the film frame.

37. The machine-readable storage medium as claimed in claim 34, wherein the step (d14) further comprises the steps of:
   (d141) when L<=((H1+S)+2×S), the film frame comprising a first negative film image, composing a template conforming to the standard width W1 and the standard length H1 and moving the template in the film frame until the sum of the first hue values of the pixels reaches a maximum to determine the first negative file image; and
   (d142) when L>((H1+S)+2×S), the film frame comprising the first film image, the second negative film image, and the interval, composing a template conforming to the standard width W1 and the interval width S and moving the template in the film frame until the sum of the first hue values of the pixels reaches a minimum to determine the first negative film image and the second negative film image.

38. The machine-readable storage medium as claimed in claim 23, when the film is a positive film, the image frame obtained in step (c) is sized with a frame width W and a frame length H, and comprises a positive film image and a space area, wherein the step (d) further comprises the steps of:
   (d21) calculating a standard width W2 and a standard length H2 of the positive film image according to the film size and a preview resolution of the scanner, wherein W2<H2;
   (d22) determining a placement direction of the positive film image in the image frame according to the frame width W, the frame length H, the standard width W2, the standard length H2, and the first hue values of the pixels; and
   (d23) recognizing the positive film image in the film frame according to the placement direction, the standard width W2, and the first hue values of the pixels in the image frame.

39. The machine-readable storage medium as claimed in claim 38, wherein in the step (d23) further deletes an area of the film frame with an average first hue value of the pixels out of a predetermined range.

40. The machine-readable storage medium as claimed in claim 38, wherein the step (d22) further comprises the steps of:
   (d221) composing a template conforming to the standard width W2 and the frame length H and moving the template in the image frame until the sum of the first hue values of the pixels reaches a maximum;
   (d222) accumulating the first hue values of the pixels in the image frame as a first sum value;
   (d223) composing a template conforming to the standard width W2 and the frame width W and moving the template in the image frame until the sum of the first hue values of the pixels reaches a maximum;
   (d224) accumulating the first hue values of the pixels in the image frame as a second sum value; and
   (d225) determining the placement direction as lengthwise if the first sum value is larger than the second sum value, if not, widthways.

41. The machine-readable storage medium as claimed in claim 40, wherein if the placement direction is lengthwise, the step (d23) further composes a template conforming to the standard width W2 and the frame length H and moves the template in the image frame in the widthways direction until the sum of the first hue values of the pixels reaches a maximum to determine a left margin and a right margin for identifying the positive film image.

42. The machine-readable storage medium as claimed in claim 41, wherein if the placement direction is lengthwise, the step (d23) further composes a template conforming to the standard width W2 and the standard length H2 and moves the template in the image frame in the lengthwise direction until the sum of the first hue values of the pixels reaches a maximum to determine a top margin and a bottom margin for identifying the positive film image.

43. The machine-readable storage medium as claimed in claim 40, wherein if the placement direction is widthways, the step (d23) further composes a template conforming to the standard width W2 and the frame width W and moves the template in the image frame in the lengthwise direction until the sum of the first hue values of the pixels reaches a maximum to determine a top margin and a bottom margin for identifying the positive film image.

44. The machine-readable storage medium as claimed in claim 43, wherein if the placement direction is widthways, the step (d23) further composes a template conforming to the standard width W2 and the standard length H2 and moves the template in the image frame in the widthways direction until the sum of the first hue values of the pixels reaches a maximum to determine a left margin and a right margin for identifying the positive film image.

45. An automatic film recognition apparatus for recognizing a film in a scanner, comprising:
an image previewing module, previewing the film using the scanner to obtain an original preview image comprising a film image corresponding to the film, wherein the original preview image comprises a plurality of pixels and each pixel has a first hue value, a second hue value, and a third hue value;
an image processing module, coupled to the image preview module, selecting the pixels with luminance in a predetermined range from the original preview image to acquire a second preview image;
an image framing module, coupled to the image processing module, framing the second preview image according to the first hue values of the pixels to obtain an image frame; and
a film recognition module, coupled to the image framing module, sectioning the image frame to recognize the film image.

46. The apparatus as claimed in claim 45, wherein image processing module further comprises:
a first image processing module, designating the number of the pixels as a pixel aggregate number;
a second image processing module, coupled to the first image processing module, calculating a first hue value minimum and a first hue value maximum according to the pixel aggregate number and the first hue values of the pixels;
a third image processing module, coupled to the second image processing module, reading the first hue values of the pixels individually; and
a fourth image processing module, coupled to the third image processing module, producing a first mapping table according to the read first hue values of the pixels to acquire the second preview image.

47. The apparatus as claimed in claim 46, wherein the first image processing module further selects the pixels with first hue values within a range, wherein the range is determined according to a transparent character of the film.

48. The apparatus as claimed in claim 46, wherein the second image processing module further composes a statistical chart based on the first hue values of the pixels, designates a noise proportion, and accumulates the first hue values of the pixels according to the statistical chart and the noise proportion to acquire the first hue value minimum and the first hue value maximum.

49. The apparatus as claimed in claim 46, wherein the fourth image processing module acquires the second image preview by executing the steps of:
(a) recording the first hue values to corresponding positions of the pixels in the first mapping table if the first hue values are within the first hue value minimum and the first hue value maximum;
(b) recording zeros to corresponding positions of the pixels in the first mapping table if the first hue values are less than the first hue value minimum or larger than the first hue value maximum; and
(c) displaying the film image according to the first mapping table to acquire the second preview image, wherein the positions recorded zeros are displayed in black.

50. The apparatus as claimed in claim 49, wherein the fourth image processing module further records the first, the second, and the third hue values to corresponding positions of the pixels in a second mapping table if the read first hue values are within the first hue value minimum and the first hue value maximum, and the fourth image processing module further records zeros to corresponding positions of the pixels in the second mapping table as the first, the second, and the third hue values of the pixels if the first hue values are less than the first hue value minimum or larger than the first hue value maximum.

51. The apparatus as claimed in claim 50, wherein the second mapping table is stored in a two-dimensional storage space.

52. The apparatus as claimed in claim 50, wherein the first hue values of the pixels are red hue values.

53. The apparatus as claimed in claim 46, wherein the first mapping table is stored in a two-dimensional storage space.

54. The apparatus as claimed in claim 45, wherein the image framing module further comprises:
a first image framing module, comparing each pixel with surrounding pixels according to the first, the second, and the third hue values;
a second image framing module, coupled to the first image framing module, marking each pixel according the comparison; and
a third image framing module, coupled to the second image framing module, searching the second preview image according to the marks to obtain the image frame.

55. The apparatus as claimed in claim 54, wherein the search performed by the third image framing module is a Breadth-First Search.

56. The apparatus as claimed in claim 45, when the film is a negative film, the image frame obtained by the image processing module is sized with an image width W and an image length L and comprises a film frame and a saw-toothed frame, wherein the film frame comprises a first negative film image, a second negative film image, and an interval, wherein the film recognition module further comprises:
a first negative film recognition module, calculating a standard width W1 and a standard length H1 of each negative film image, and calculating an interval width S of the interval according to the film size and a preview resolution of the scanner, wherein W1<H1;
a second negative film recognition module, coupled to the first negative film recognition module, determining a placement direction of each negative film image in the image frame according to the image width W and the image length L;
a third negative film recognition module, coupled to the second negative film recognition module, determining an area comprising the film frame according to the placement direction, the standard width W1, and the first hue values of the pixels in the image frame; and
a fourth negative film recognition module, coupled to the third negative film recognition module, recognizing the first and the second negative film images in the film frame according to the standard width W1, the standard length H1, the interval width S, and the first hue values of the pixels of the film frame.

57. The apparatus as claimed in claim 56, wherein the fourth negative film recognition module further deletes an area of the film frame with an average first hue value out of a predetermined range.

58. The apparatus as claimed in claim 56, wherein if the placement direction is widthways, the third negative film recognition module further composes a template conforming to the standard width W1 and the image Length L and moves the template in the lengthwise direction in the image frame until the sum of the first hue values of the pixels reaches a maximum to determine the area of the film frame.

59. The apparatus as claimed in claim 56, wherein the fourth negative film recognition module recognizes the first and the second negative film images by executing the steps of:
   (a) when L<=((H1+S)+2×S), the film frame comprising a first negative film image, composing a template conforming to the standard width W1 and the standard length H1 and moving the template in the film frame until the sum of the first hue values of the pixels reaches a maximum to determine the first negative file image; and
   (b) when L>((H1+S)+2×S), the film frame comprising the first film image, the second negative film image, and the interval, composing a template conforming to the standard width W1 and the interval width S and moving the template in the film frame until the sum of the first hue values of the pixels reaches a minimum to determine the first negative film image and the second negative film image.

60. The apparatus as claimed in claim 45, when the film is a positive film, the image frame obtained by the image framing module is sized with a frame width W and a frame length H, and comprises a positive film image and a space area, wherein the film recognition module further comprises:
   a first positive film recognition module, calculating a standard width W2 and a standard length H2 of the positive film image according to the film size and a preview resolution of the scanner, wherein W2<H2;
   a second positive film recognition module, coupled to the first positive film recognition module, determining a placement direction of the positive film image in the image frame according to the frame width W, the frame length H, the standard width W2, the standard length H2, and the first hue values of the pixels; and
   a third positive film recognition module, coupled to the second positive film recognition module, recognizing the positive film image in the film frame according to the placement direction, the standard width W2, and the first hue values of the pixels in the image frame.

61. The apparatus as claimed in claim 60, wherein the third positive film recognition module further deletes an area of the film frame with average first hue value out of a predetermined range.

62. The apparatus as claimed in claim 60, wherein the second positive film recognition module determines the placement direction by executing the steps of:
   (a) composing a template conforming to the standard width W2 and the frame length H and moving the template in the image frame until the sum of the first hue values of the pixels reaches a maximum;
   (b) accumulating the first hue values of the pixels in the image frame as a first sum value;
   (c) composing a template conforming to the standard width W2 and the frame width W and moving the template in the image frame until the sum of the first hue values of the pixels reaches a maximum;
   (d) accumulating the first hue values of the pixels in the image frame as a second sum value; and
   (e) determining the placement direction as lengthwise if the first sum value is larger than the second sum value, if not, widthways.

63. The apparatus as claimed in claim 62, if the placement direction is lengthwise, the third positive film recognition module composes a template conforming to the standard width W2 and the frame length H and moves the template in the image frame in the widthways direction until the sum of the first hue values of the pixels reaches a maximum to determine a left margin and a right margin for identifying the positive film image.

64. The apparatus as claimed in claim 63, if the placement direction is lengthwise, the third positive film recognition module further composes a template conforming to the standard width W2 and the standard length H2 and moves the template in the image frame in the lengthwise direction until the sum of the first hue values of the pixels reaches a maximum to determine a top margin and a bottom margin for identifying the positive film image.

65. The apparatus as claimed in claim 62, if the placement direction is widthways, the third positive film recognition module further composes a template conforming to the standard width W2 and the frame width W and moves the template in the image frame in the lengthwise direction until the sum of the first hue values of the pixels reaches a maximum to determine a top margin and a bottom margin for identifying the positive film image.

66. The apparatus as claimed in claim 65, if the placement direction is widthways, the third positive film recognition module further composes a template sized with the standard width W2 and the standard length H2 and moves the template in the image frame in the widthways direction until the sum of the first hue values of the pixels reaches a maximum to determine a left margin and a right margin for identifying the positive film image.

* * * * *